Jan. 11, 1966  R. A. HERSEY  3,228,209
TORQUE LIMITING FLEXIBLE COUPLING
Filed March 18, 1964
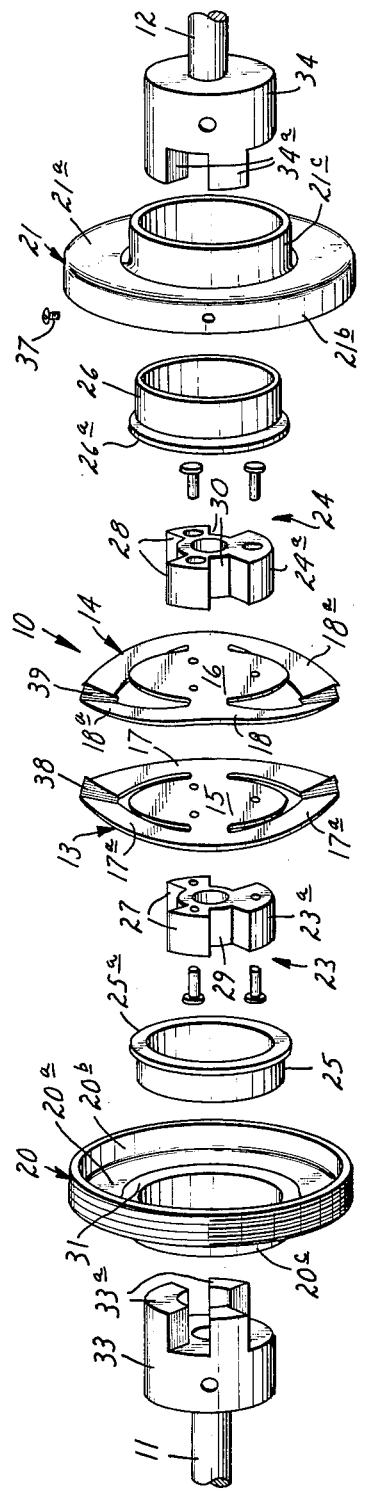
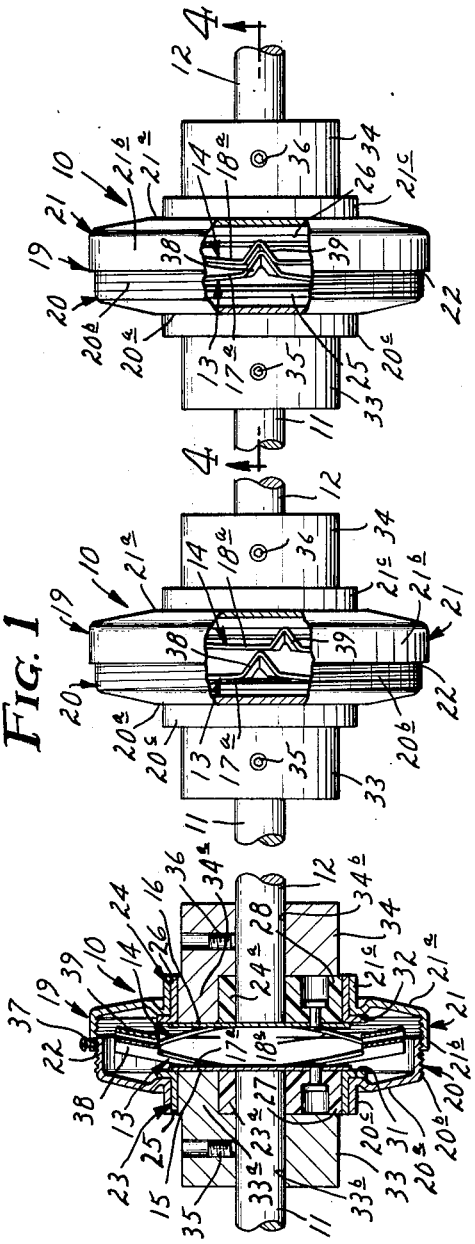
INVENTOR.
RICHARD A HERSEY
BY
Merchant, Merchant + Gould
ATTORNEYS

United States Patent Office 3,228,209
Patented Jan. 11, 1966

3,228,209
TORQUE LIMITING FLEXIBLE COUPLING
Richard A. Hersey, 1937 James Ave. S.,
Minneapolis, Minn.
Filed Mar. 18, 1964, Ser. No. 352,931
6 Claims. (Cl. 64—29)

My invention relates to spring-loaded clutch assemblies of the type having a variable torque rating. More specifically, my invention relates to devices of the class above described which include a pair of disc-like clutch elements which are retained in engagement under compression and which clutch elements disengage at predetermined torque loads and reset automatically, as the overload is relieved.

A further object of my invention is the provision of a device of the class immediately above described which delivers a token torque, even under conditions of overload, so as to enable same to be used to start high inertia loads.

A still further object of my invention is the provision of novel means whereby the compression under which the clutch elements are maintained may be quickly and accurately modified or adjusted in the field with a minimum of skill and schooling.

A further object of my invention is a device of the class described which is so constructed as to reduce an audible signal under conditions of overload.

A still further object of my invention is the provision of a device of the class described which facilitates interposition thereof between a drive and a driven member.

A further object of my invention is the provision of a device of the class immediately above described which by virtue of its construction permits a slight angular misalignment between a drive and a driven member.

A still further object of my invention is a device of the class described which incorporates a minimum of working parts, is substantially foolproof in operation, and durable in use.

A further object of my invention is the provision of a device of the class described which is inexpensive to produce, is light in weight, and compact in size so as to facilitate handling, storage, and shipment.

The above and still further objects of my invention will become apparent from the following detailed specification, appended claims, and attached drawings.

Referring to the drawings wherein like characters indicate like parts throughout the several views:

FIG. 1 is an exploded view in perspective of my novel device;

FIG. 2 is a view in elevation, some parts being broken away and shown in section;

FIG. 3 is a view corresponding to FIG. 1, but shows a different position of some of the parts; and FIG. 4 is a view in axial section as seen from the line 4—4 of FIG. 2.

Referring with greater particularity to the drawings, the numeral 10 indicates generally my novel spring-loaded clutch assembly having a variable torque rating and adapted to be interposed between a driven member 11 and a drive member 12. Clutch assembly 10 comprises a pair of axially aligned disc-like clutch elements 13, 14, preferably stamped from spring steel. As shown, each of the clutch elements 13, 14 is formed to define central hub portions 15, 16, respectively, and peripheral portions 17, 18, portions of which are axially offset in an undulating manner at circumferentially spaced points, as indicated at 17a, 18a, respectively.

As shown, clutch elements 13, 14 are contained within a housing identified in its entirety by 19 and comprising a pair of annular concentric housing members 20, 21 in a manner whereby the axially offset portions 17, 18 oppose each other. In this manner, the hub portions 15, 16 are yieldingly biased apart.

Housing sections 20, 21 are each formed to define annular side wall portions 20a, 21a, generally cylindrical peripheral wall portions 20b, 21b, respectively, which have threaded engagement, as indicated at 22, and axially outwardly extending concentric central bearing portions 20c, 21c. Each of the portions 15, 16 define axially outwardly extending trunnions, identified generally by numerals 23, 24, respectively, which extend through and are journalled for rotation in adjacent bearing portions of the housing members 20, 21. As shown, trunnions 23, 24 are in the nature of female coupler elements 23a, 24a, which are secured to their respective hub portions 15, 16 by rivets and the like. Telescopically non-rotatively received over the coupler elements 23a, 24a are bearing sleeves 25, 26 which are rotatively received within adjacent central bearings portions 20c, 21c, as indicated particularly in FIG. 4. Coupler members 23a, 24a, together with bearing sleeves 25, 26 cooperate to define circumferentially spaced jaw elements 27, 28, respectively, and axially outwardly opening circumferentially spaced jaw-receiving recesses 29, 30.

As shown, the bearing sleeves 25, 26 are formed at their axially inner ends to define diametrically enlarged annular thrust bearings 25a, 26a, respectively, which engage the adjacent housing members 20, 21 immediately radially outwardly of the central hub bearing portions 20c, 21c.

In order to reduce the frictional engagement of the thrust bearings 25, 26 with their respective casing members 20, 21, said casing sections 20, 21 immediately radially outwardly of their respective central hub bearing portions 20c, 21c, are axially inwardly offset to define relatively narrow annular thrust bearing engaging beads 31, 32.

To facilitate coupling of the clutch elements 13, 14 to generally axially aligned driven and drive members 11, 12, respectively, I provide identical annular male coupling members 33, 34 which, at their axially inner ends, are provided with circumferentially spaced jaw elements 33a, 34a, for reception into the recesses 29, 30 of the female coupling elements 23a, 24a. To securely lock the said male coupling elements 33, 34 to their respective rotary members 11, 12 within the central recesses 33b, 34b, set screws 35, 36 are provided. It is well known that jaw couplings of this general type permit axial misalignment between the driven and drive shafts 11, 12.

Because of the shape, spacing and disposition of the clutch elements 13, 14 within the housing 19, the peripheral portions 17, 18 of the former are under axial compression. Obviously, this compression may be readily varied on the job by merely loosening of the set-screw means 37 which lock the housing sections 20, 21 together against accidental relative rotation, and thereby imparting intentional relative rotation to one of said members with respect to the other thereof.

To materially increase the torque required to cause relative rotation between the clutch elements 13, 14 for a desired torque load, the offset peripheral portions 17, 18 of the clutch elements 13, 14 are further offset in the same direction to provide V-shaped cooperating latch dogs and latch dog-receiving recess means 38, 39, respectively. During normal torque loads, latch dogs 38 are received within one of the recesses 39, shown in FIG. 2. Furthermore, these elements will return to their nesting positions when overload conditions have been relieved. However, because the peripheral portions 17, 18 are always under some compression, a token torque is achieved even under conditions of overload. This factor is particularly of value in that it enables the device to be used to start high inertia loads.

A further factor of importance is that during overload conditions a considerable audible signal is achieved as the latch dogs 38 enter and leave the recesses 39 during relative rotation of the disc elements 13, 14.

My invention has been thoroughly tested and found to be completely satisfactory for the accomplishment of the above object; and while I have disclosed a preferred embodiment thereof, same may well be capable of modification without departure from the scope and spirit of the appended claims.

What is claimed is:

1. In a spring-loaded clutch assembly having a variable torque rating,
   (a) a pair of axially aligned resilient cooperating disc-like clutch elements having
      (1) central hub portions and
      (2) peripheral portions which are axially offset toward each other at circumferentially spaced points from the planes of the respective hub portions whereby to yieldingly bias said hub portions apart,
   (b) a pair of annular concentric housing members encompassing said clutch elements, said housing members being formed to provide
      (1) annular side wall portions,
      (2) generally cylindrical peripheral wall portions which have screw threaded engagement with each other and
      (3) axially outwardly extending concentric central bearings portions,
   (c) each of said hub portions defining axially outwardly extending trunnions which extend through and are journalled for rotation in one of said bearing portions,
   (d) said side wall portions of said casing members engaging adjacent hub portions and maintaining said peripheral portions of said clutch elements in engagement with each other under axial compression,
   (e) rotative adjustment of one of said housing members with respect to the other thereof varying said compression.

2. The structure defined in claim 1 in further combination with releasable means for locking said casing members against relative rotation.

3. The structure defined in claim 1 in which said hub portions are formed at their axially inner ends with diametrically enlarged annular flanges which engage the inner walls of adjacent housing members to provide thrust bearings.

4. The structure defined in claim 3 in which said trunnions define circumferentialy spaced jaws and jaw-receiving recesses.

5. The structure defined in claim 3 in which said housing members adjacent the inner ends of their respective central bearing portions are axially inwardly offset to define relatively narrow annular thrust-bearing engaging beads.

6. The structure defined in claim 1 in which the axially offset peripheral portions of said clutch elements are axially offset in the same direction to provide generally V-shaped cooperating latch dog and latch dog-receiving recess means whereby to materially increase the torque required to impart relative rotation between said clutch elements.

References Cited by the Examiner
UNITED STATES PATENTS

| | | | |
|---|---|---|---|
| 2,145,083 | 1/1939 | Dynes | 64—29 |
| 2,230,756 | 2/1941 | Lohry | 64—30 |
| 2,599,292 | 6/1952 | Steinbach et al. | 64—30 |
| 2,802,354 | 8/1957 | Bohnoff et al. | 64—29 |

BROUGHTON G. DURHAM, *Primary Examiner.*

HALL C. COE, *Assistant Examiner.*